L. M. COX.
DRY DOCK.
APPLICATION FILED JULY 23, 1908.

931,182.

Patented Aug. 17, 1909.
7 SHEETS—SHEET 1.

Witnesses:

Inventor:
Leonard M. Cox,

L. M. COX.
DRY DOCK.
APPLICATION FILED JULY 23, 1908.

931,182.

Patented Aug. 17, 1909.
7 SHEETS—SHEET 2.

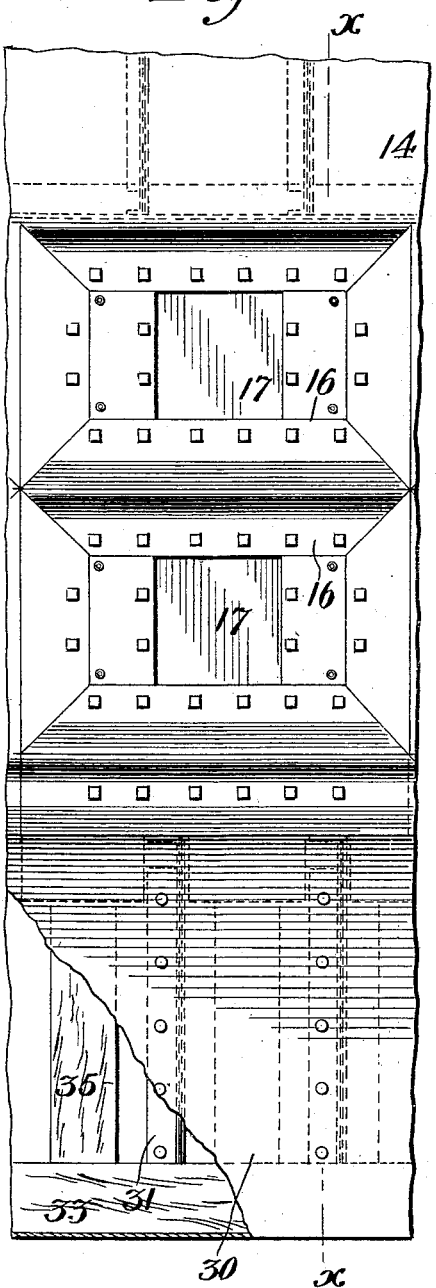
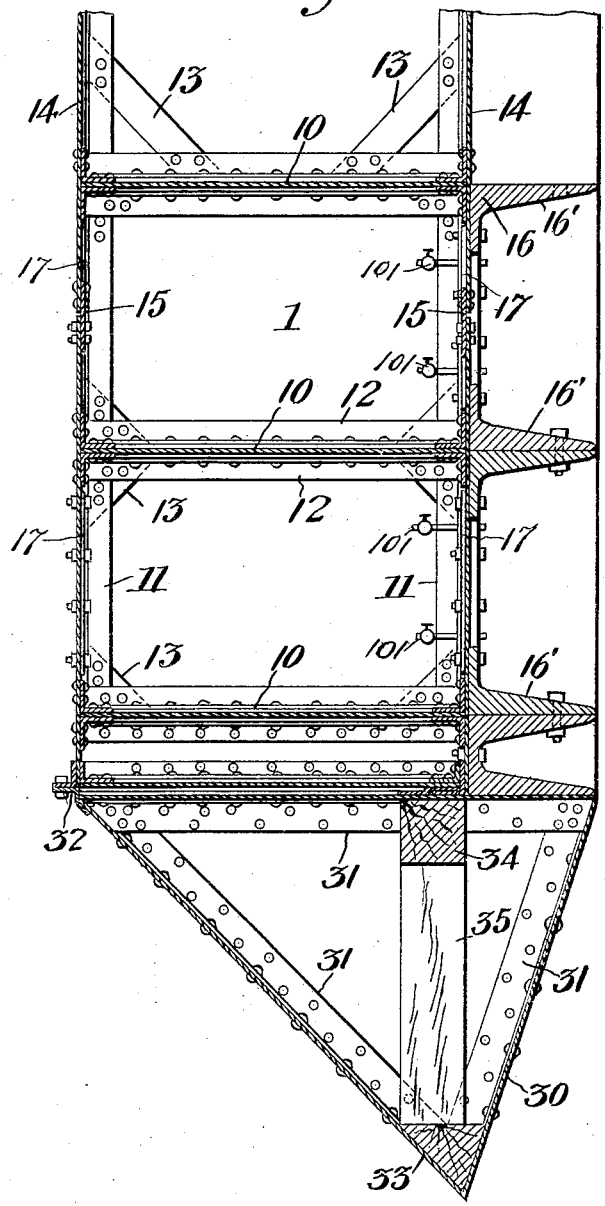

L. M. COX.
DRY DOCK.
APPLICATION FILED JULY 23, 1908.

931,182.

Patented Aug. 17, 1909.
7 SHEETS—SHEET 5.

Witnesses:

Inventor.
Leonard M. Cox

L. M. COX.
DRY DOCK.
APPLICATION FILED JULY 23, 1908.
931,182.
Patented Aug. 17, 1909.
7 SHEETS—SHEET 6.
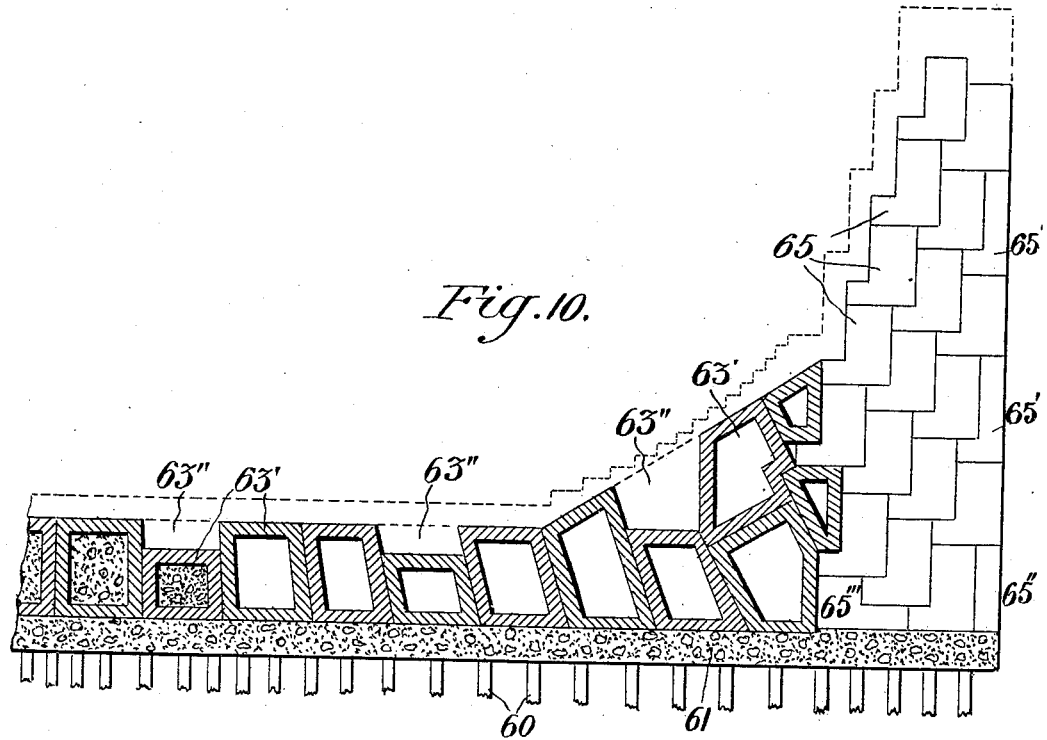
Fig. 10.
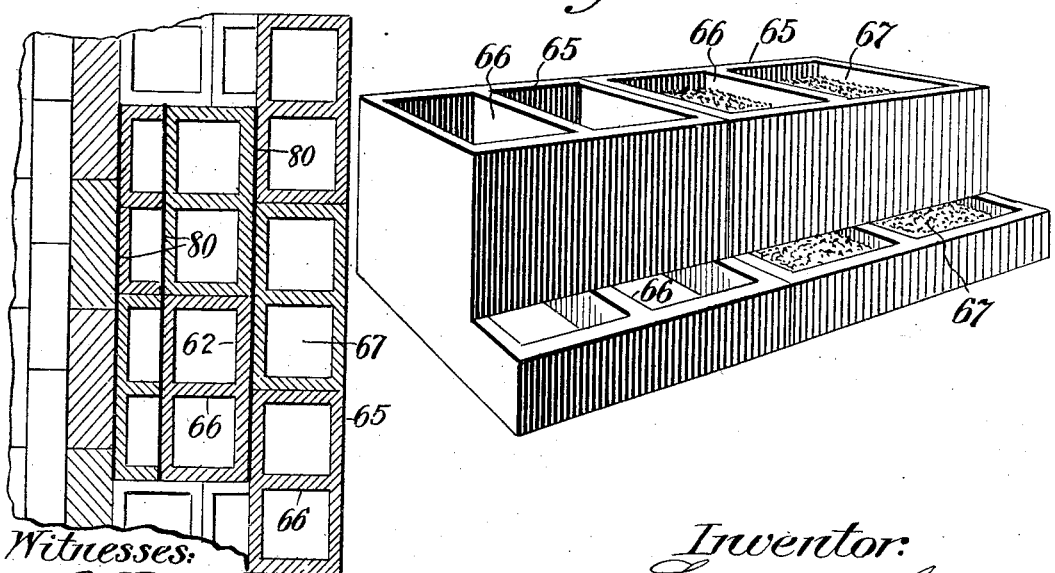
Fig. 11.
Fig. 12.
Witnesses:
Inventor:
Leonard M. Cox

L. M. COX.
DRY DOCK.
APPLICATION FILED JULY 23, 1908.

931,182.

Patented Aug. 17, 1909.
7 SHEETS—SHEET 7.

Witnesses:

Inventor:
Leonard M. Cox

UNITED STATES PATENT OFFICE.

LEONARD M. COX, OF BROOKLYN, NEW YORK.

DRY-DOCK.

No. 931,182.　　　　Specification of Letters Patent.　　　Patented Aug. 17, 1909.

Application filed July 23, 1908.　Serial No. 444,946.

*To all whom it may concern:*

Be it known that I, LEONARD M. Cox, a citizen of the United States, residing in the city of Brooklyn, county of Kings, State of New York, have invented certain new and useful Improvements in Dry-Docks and the Like; and I do hereby declare the following to be a full, clear, and exact description of the invention, such as will enable others skilled in the art to which it appertains to make and use the same.

The invention relates to the construction of dry docks and like structures and more particularly to structures of the character indicated, erected in subaqueous or partially subaqueous locations, and the objects of the invention are to greatly simplify the work of excavation and construction and materially lessen the cost in all departments of the work and at the same time produce a structure of any dimensions required and in any location capable of receiving and sustaining a subfoundation of piling or the like.

Figure 1:
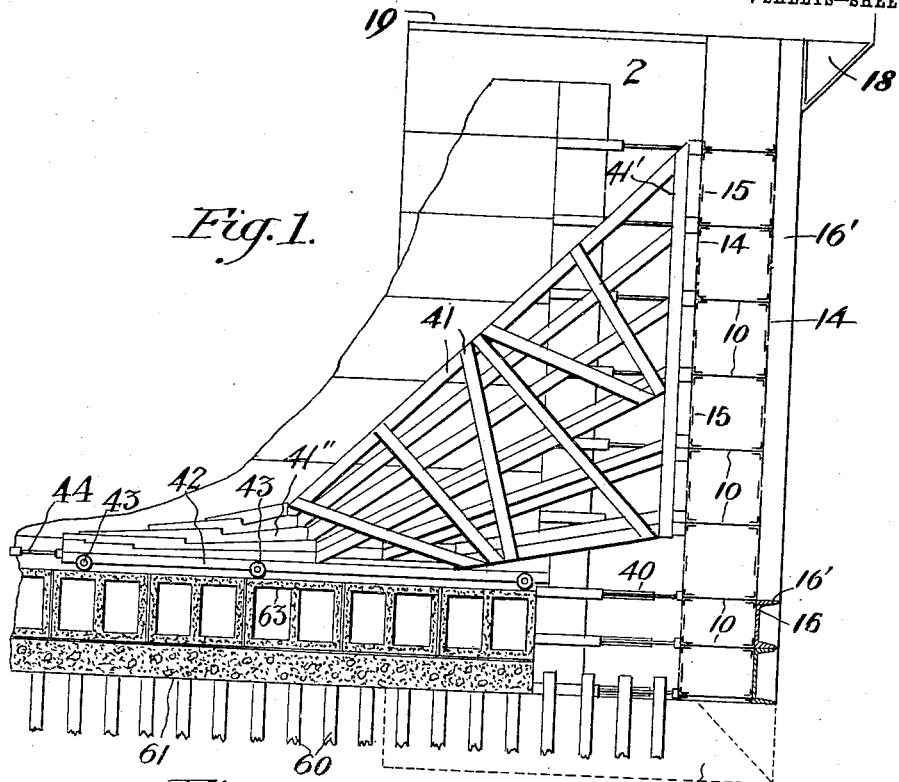
Figure 2:
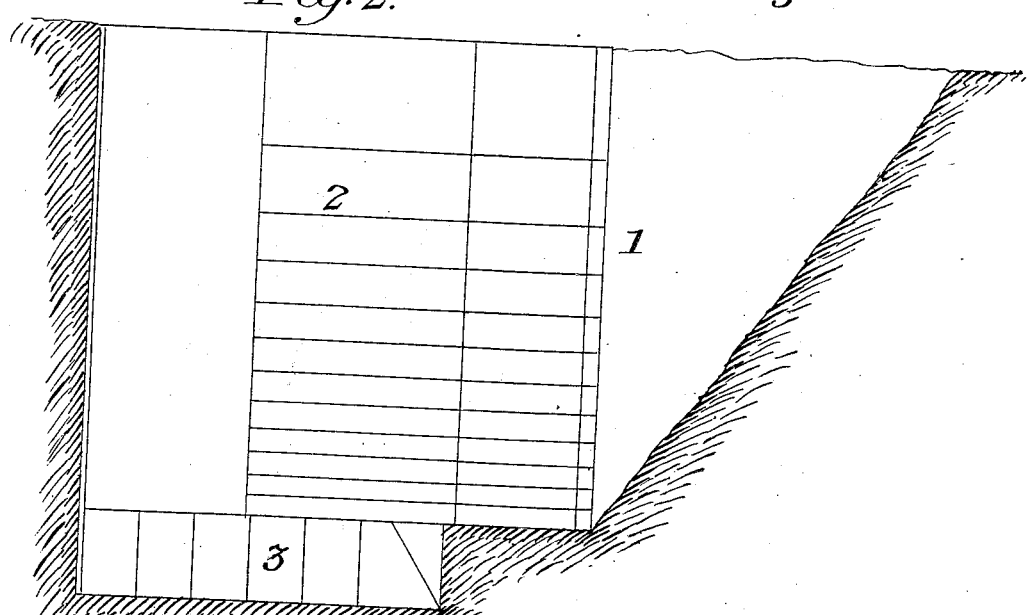
Figure 3:
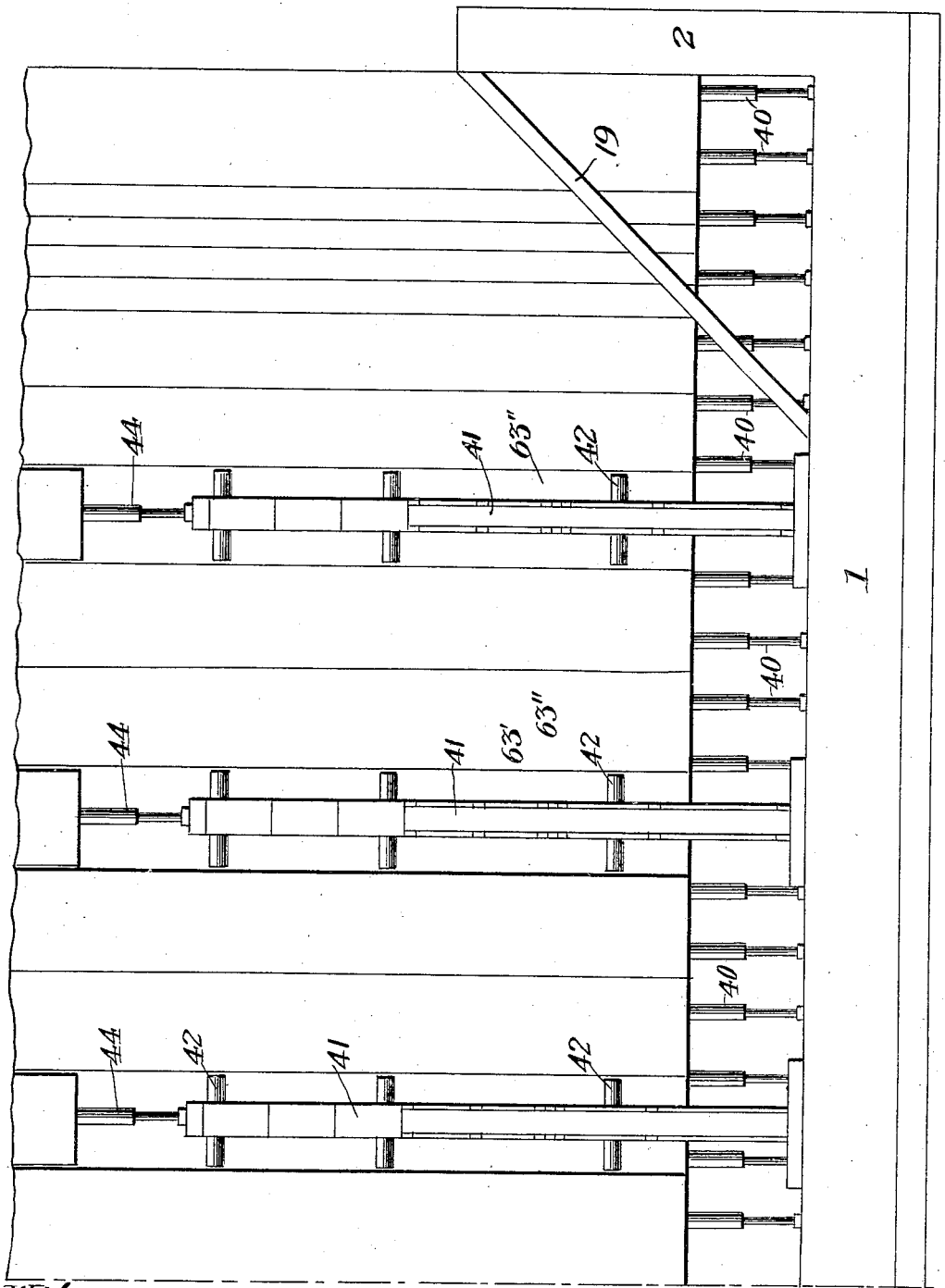
Figure 4:
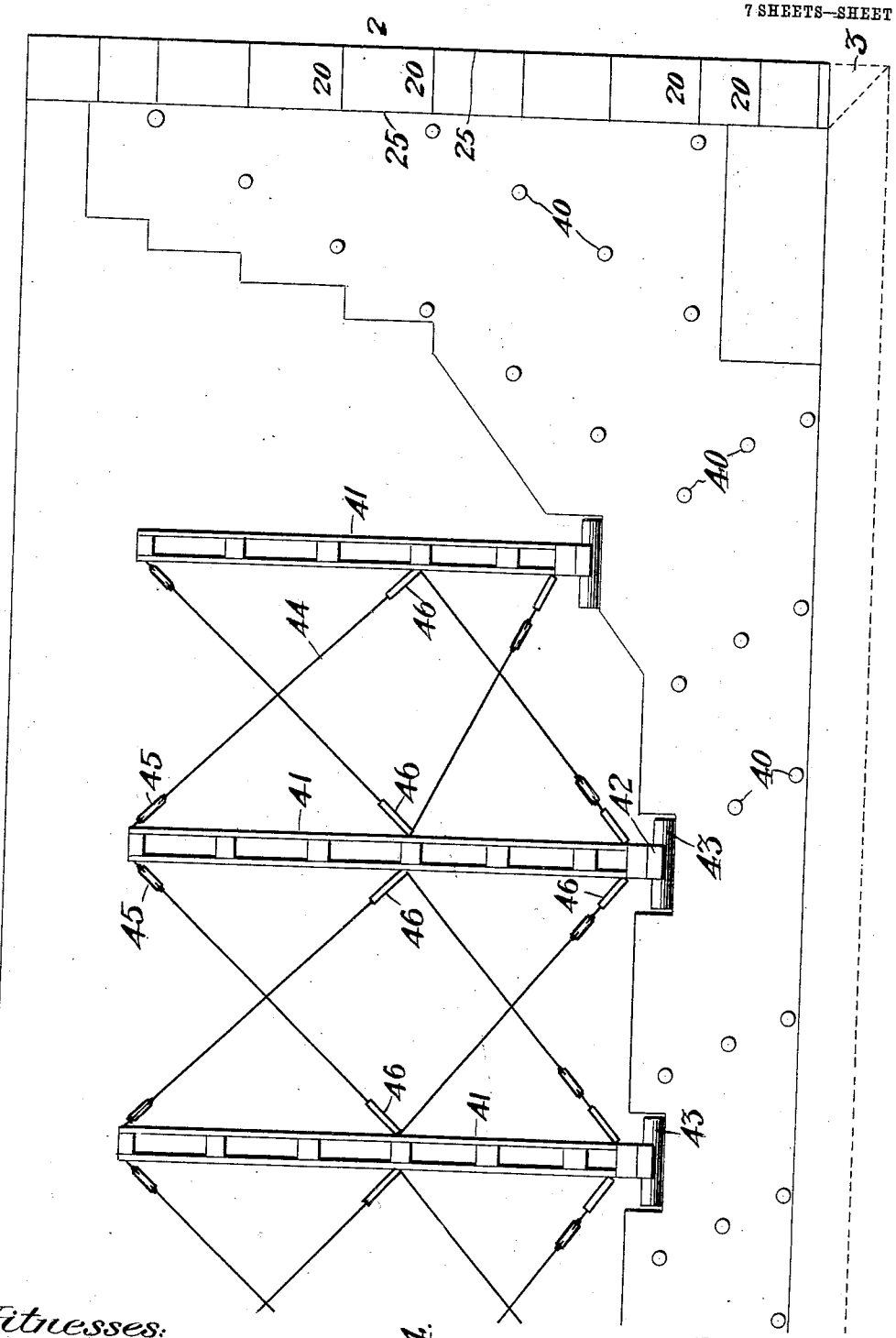
Figure 7:
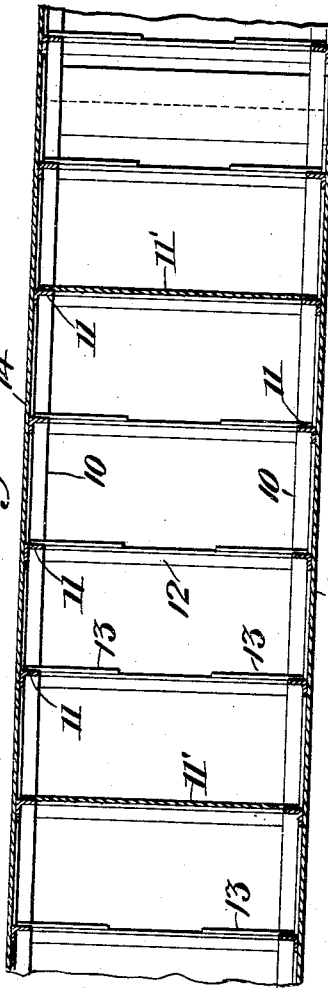
Figure 8:
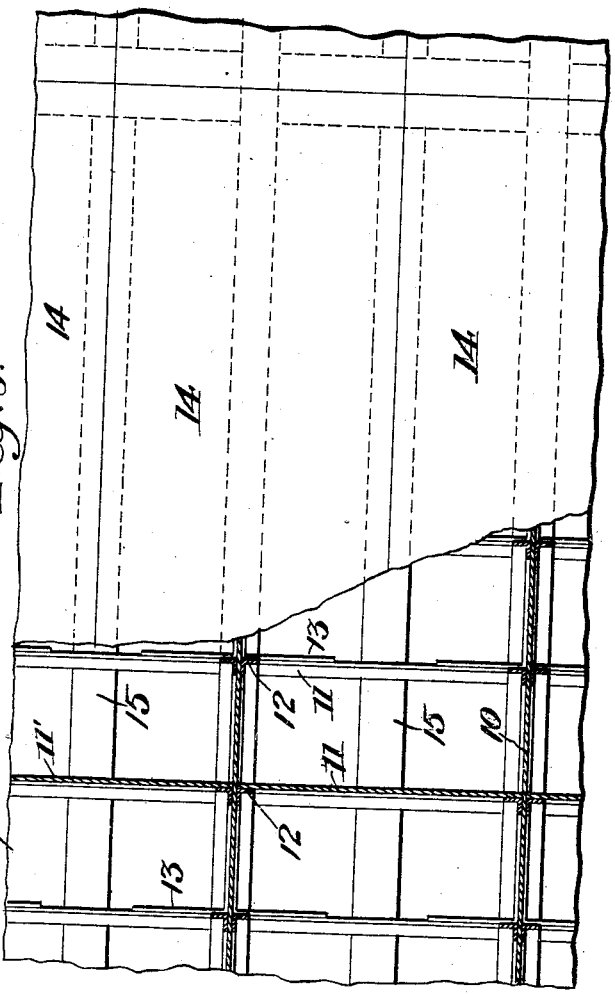
Figure 9:
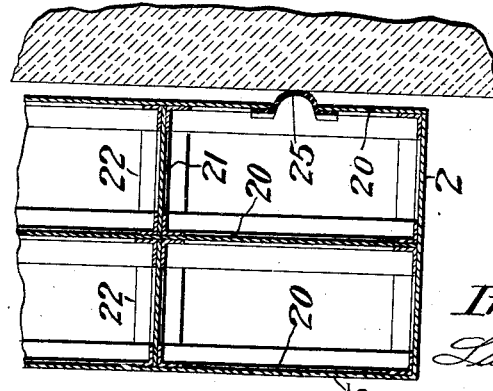
Figure 13:
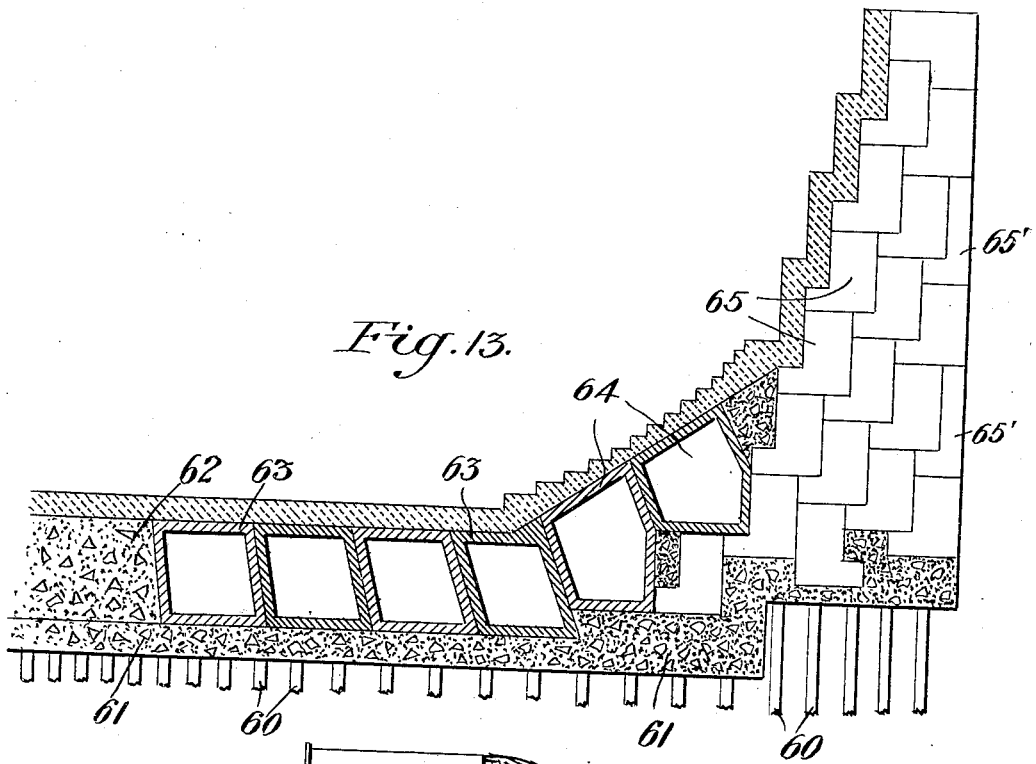
Figure 14:
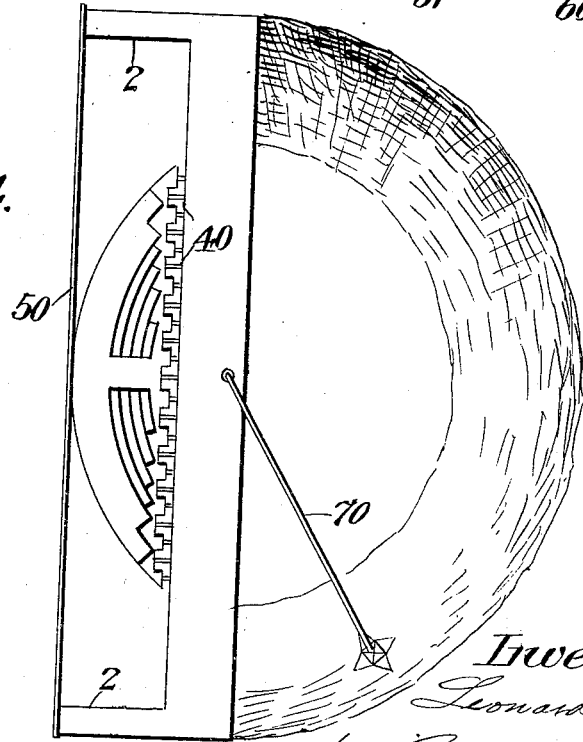

These and other objects of the invention will appear more particularly in the appended specification, when considered in connection with the accompanying drawings, in which:

Figure 1 is a longitudinal section through a portion of the dry dock in course of construction, showing the apparatus employed. Fig. 2 is a diagrammatic representation of the movable coffer-dam and its associated bottom shoe. Fig. 3 is a half plan view of a completed section of the dry dock showing the relation of the coffer-dam thereto. Fig. 4 is a corresponding front elevation. Fig. 5 is a vertical section through the lower portion of the front wall of the coffer-dam illustrating the details of construction. Fig. 6 is a front elevation of the same, the lower portion being broken away in part. Fig. 7 is a horizontal section through a portion of the front wall of the coffer-dam. Fig. 8 is an inside elevation of a portion of the front wall of the coffer-dam, part of the same being shown in section. Fig. 9 is a horizontal section through a portion of one of the wing walls illustrating the mode of applying the pneumatic packing between said wing wall and the wall of the dock. Fig. 10 is an end elevation, partly in section of one-half of a partially completed dock illustrating the manner of constructing the same. Fig. 11 is a fragmentary sectional plan view of one of the side walls of the dock. Fig. 12 is a perspective view of two of the typical concrete blocks forming the side walls of the dock. Fig. 13 is a view corresponding to Fig. 10 showing a slightly modified construction of dock. Fig. 14 is a diagrammatic plan view illustrating the method of constructing the dock sections and excavating in front of the coffer-dam.

In the construction of dry docks, subaqueous walls and similar structures as heretofore practiced, it has been the general custom to excavate the entire earth prism to receive the structure, or where the character of the ground would not permit this, to drive sheet piling or the like to form a coffer-dam about the site of the entire structure or an integral portion of such site and then excavate the material within the coffer-dam to the proper depth to permit the work to be carried on. The difficulties attending such procedure are manifest and involve heavy labor and expense not only for the actual work of excavation but in maintaining the integrity of the coffer-dam and keeping the excavation free of water. As a matter of fact, the construction of one or more large dry docks had to be abandoned because the character of the ground rendered it impossible to maintain a tight coffer-dam *in situ* long enough to construct even a section of the dock. These and other considerations led up to the present invention, which contemplates the employment of a movable coffer-dam adapted to be erected in sections and to be moved ahead progressively while the work is being carried on within said dam so that the only excavation necessary at any one time is that of a frusto-conical section of earth immediately ahead of the coffer-dam, the diameter of the upper semicircular rim of the excavation being substantially equivalent to the width of the completed dock and the walls of the excavation being permitted to take the natural slope of the earth, as particularly illustrated in Fig. 14. The coffer-dam proper comprises a front wall and two side or wing walls so that said dam is open at the top, bottom and rear, leaving a perfectly free open space within which to effect the work of construction.

Referring more particularly to Figs. 1 to 9 of the drawings, the numeral 1 indicates the front wall of the coffer-dam to which is rigidly secured two wing walls 2—2, extending rearwardly and at right angles from the front wall, and associated therewith is a cutting shoe 3 detachably secured to the under faces of the front and wing walls which serves to assist in the operation of sinking the coffer-dam. It will be noted that with this particular construction, the top, bottom and rear of the coffer-dam are open and unobstructed. In applying a coffer-dam of this general character to the construction of a dry dock, for instance, a line of sheet piling 50, or the equivalent thereof, is driven at the head of the site to be occupied by the structure, and the coffer-dam applied in front of the sheet piling to form with the latter a rectangular inclosure. Excavation is then carried on inside of the coffer-dam and along the front wall thereof to permit the dam to sink gradually to the required depth until the parts occupy the relation shown in Fig. 14. After the space within the dam has been completely excavated, the first or head section of the dry dock is erected, the space within the dam affording ample room for this purpose and being readily kept free from water, so that the workmen have a large roomy open inclosure within which to operate. Water tight joints will, of course, be maintained between the sheet piling and the end of the coffer-dam in accordance with any of the well-known means for effecting such joints. When the first section of the dock has been completed or finished to the required degree, the coffer-dam is forced ahead in a horizontal direction to open up another space for continuing the erection of the dock, and to facilitate the forward movement of the dam the earth ahead of the same is excavated preferably in the manner illustrated in Fig. 14, viz., to leave an excavation in the form of the half of an inverted frustum or cone, the basal diameter of which is substantially equal to the width of the dock, so that as the dam is forced forward, it cuts out the side walls of the excavation which conform to the natural slope of the ground. For this new position of the coffer-dam, additional sheet piling may be driven extending from the finished portion of the dock to the wing walls of the dam. The dam is thus advanced by successive stages and integral sections of the dock erected within the dam, and when the dock reaches its ultimate width, an effective seal may be maintained between the wing walls of the coffer-dam and the outer side walls of the dock. It will be noted that the only open excavation required at any stage of the work is that relatively small frusto-conical section of the dock prism immediately ahead of the coffer-dam to permit said coffer-dam to be moved forward one space. By this means the banks on either side of the structure will be in no danger of giving away and the work may be carried on close to large buildings without materially endangering the same. Excessive pumping will be avoided and at no time will there be more than a few feet of the sub-grade exposed.

The foregoing covers the broad principles of the construction and application of the coffer-dam to the erection of a dry dock. In actual use, the coffer-dam will preferably be constructed in sections connected together in vertical series so that as the dam is being sunk to the depth required, it may be built up progressively and practically all of the work of erecting the dam may be carried on at grade. A convenient mode of constructing the dam in accordance with this principle is that illustrated in detail in Figs. 5 to 9. The front wall of the dam, which is also adapted to be used as a hollow caisson for carrying on any operations which may involve the use of heavy air pressure, is made up of horizontal longitudinal sections connected in vertical series to build up the dam to the required height. Each section of said front wall comprises a girder 10 which is conveniently formed of sheet steel with reinforcing angles along the edges to constitute the flanges, each of said girders being provided with vertical transverse spacing frames which are made up of angles or like shapes 11 and 12 with diagonal corner braces 13, and to the flanges of the girders 10 and the edges of the spacing frames are secured facing plates 14 of steel or other suitable sheet metal, the plates being extended so as to meet along their horizontal edges substantially midway between the spaced girders, the joints between the meeting edges of the facing plates being sealed by fish plates or facing strips 15. In order to divide the hollow structure constituting the front wall, into water tight compartments, certain of the girders 10 may be made up of plates to constitute the bottom of one compartment and the top of the next below and the intermediate girders 10 may be made in open or latticed form and to form the side walls of these compartments, certain of the spacing frames formed by the angles 11 and 12 may be filled in with solid plates and both these partitions and the plate girders 10 may be provided with fluid tight doors or covers to admit of communication between the compartments when the doors or covers are open. The front and back faces of the front wall may also be provided at suitable intervals with fluid tight doors 17 to admit the workmen into the compartments and also to permit obstacles encountered in front of the advancing coffer-dam to be removed. Any suitable apparatus may be provided for supplying air under pressure to the various compartments in the front wall of the coffer-dam, and likewise the forward face of said front wall may be supplied with suitable jetting devices 101 for the purpose of directing strong hydraulic jets against the earth in front of the dam to facilitate the removal of such earth.

The forward face of the front wall of the dam is preferably provided with a series of cutting edges or knives which serve to separate the unexcavated portions of the earth ahead of the dam into sections and thereby facilitate its removal. These cutting edges are constructed in the manner more particularly shown in Figs. 5 and 6, and constitute angular flange-like sections 16' surrounding cast metal plates 16 which are bolted to the face of the dam as shown. The flanges 16' of adjacent sections abut each other and are finished on their meeting faces with ground joints so that the resulting structure constitutes a relatively sharp wedge-like extension of generally rectangular form. If desired, these cutting edges may be limited to that portion of the forward dam face which encounters the earth left on the natural slopes of the preliminary excavation illustrated in Fig. 14, and, in such cases, the cutting edges will be located horizontally along the lower edge and vertically along the side edges of the dam face.

The side or wing walls 2 may be constructed in the same way as the front wall, omitting however the cutting plates which are not necessary. If desired, however, the side or wing walls may be made of somewhat lighter construction than the front wall, inasmuch as the said side walls do not have to sustain any heavy lateral pressure. Such a lighter construction is illustrated in Fig. 9, wherein the side wall is shown as made up of cellular units comprising spacing frames 22, supporting side and intermediate plates 20, the whole constituting longitudinal units of the same relative thickness as the units of the front wall, the several units preferably decreasing in thickness as they approach the top and the pressure diminishes. One or more of the sections of the side wall in each horizontal series is preferably made air tight and serves as a compartment to contain air under pressure for the purpose of effecting a seal between the side of wing walls and the outer face of the completed sections of the dock. For this purpose, the air tight sections aforesaid are each provided with a vertical slot, the slots registering throughout the height of the wing wall, and laced over said slot is a diaphragm 25 of rubber or the like which, under the action of the compressed air is forced out into close engagement with the outer wall of the dock and serves effectually to prevent ingress of water to the coffer-dam. During the preliminary stages of sinking the coffer-dam and building the first sections of the dock, the openings occupied by the rubber diaphragms may be closed by metal cover plates.

As hereinbefore indicated, the lower faces of the front and side walls of the coffer-dam are provided with removable shoes 30 which are generally wedge-shaped in cross section and materially facilitate the sinking of the dam to the desired depth when the earth is excavated about the edges of the dam. These shoes may be conveniently made in the form shown in Fig. 5, consisting of triangular spacing frames 31 formed of angle irons or other suitable shapes which are covered with sheet steel 30 on all sides and strengthened by triangular beams 33 located at the lower angle and transverse beams 34 across the top with vertical struts 35 between the two. The shoe may be made in sections or units to facilitate its removal piece by piece after the dam has advanced from its initial position, so that as each section of the shoe is uncovered by the advancing dam, it may be disconnected from the next section and taken up. The several shoe sections are connected to the lower face of the dam by suitable bolts 32 which, of course, are removed when the dam is moved from its first position.

In order to brace the front wall of the dam against the heavy pressure of the earth in front of the same as said dam is advanced and also to sustain the dam against the pressure of water which may seep in or accumulate in the excavation ahead of the same, there is provided a system of shores illustrated in Figs. 1, 3 and 4, each of said shores consisting of a connected series of inclined struts 41 abutting a vertical beam 41' along their front edges and anchored at their heels against a series of interlocked abutments 41'' which are securely fastened to a horizontal beam 42 mounted on rollers 43. These shores abut the rear face of the front wall of the coffer-dam and both the coffer-dam and the shores are adapted to be moved forward as the work progresses, section by section, by means of hydraulic jacks 40 and 44 respectively, the jacks 40 being placed between the front edges of the finished portions of the dock and the rear wall of the coffer-dam and the jacks 44 being located between the rear end of the shores and suitable abutment blocks on the bottom of the dam. These shores are spaced at proper intervals transversely of the dock to properly brace the front face of the cofferdam and are preferably tied together to prevent lateral movement by means of diagonal tie rods 44 arranged as shown in Fig. 4, each tie rod being provided with a turnbuckle 45 for tightening the same and a link 46 which is removable. In case it is desired to provide a sub-foundation of piles for the entire dock, it will be necessary to move the individual shores laterally to drive any piles which should be placed below the position occupied by the shores. In order to effect this and still maintain the rigid cross bracing between the several shores, said shores are adjusted one at a time and to compensate for the varying length of the diagonal cross braces, the links 46 are removed from one set of tie rods and secured to the tie rods on the other side of the shore, thus lengthening one set of tie rods and shortening the other by the same amount, the shortened tie rods, of course, being connected directly to the shore.

The top section of the coffer-dam serves as a platform for carrying on parts of the work and may be extended, if desired, by means of a bracket supported scaffold 18, as illustrated in Fig. 1, and the front and wing walls are preferably tied together by diagonal braces 19. On the platform at the top of the front wall there may be mounted a derrick 70 carrying an excavator, of the bucket, clam-shell or other suitable type, for the purpose of removing the earth ahead of the coffer-dam, as indicated in Fig. 14.

A further feature of my invention relates to the construction of the dock, the main portion of which I preferably form of hollow, interlocking, reinforced concrete blocks, which, while providing sufficient strength to withstand all possible internal and external strains incident to location and use, effect a great saving of time and material. In its preferred form, the dock comprises a sub-foundation of piling 60, where such is found necessary, which is overlaid with mass concrete 61 and on top of this is laid the hollow concrete blocks which constitute the bottom and walls of the dock. As illustrated in Figs. 10 and 12, the concrete blocks constituting the bottom or floor of the dock are arched to transmit the hydrostatic pressure to the side walls and, if preferred, the portion of the floor which will be occupied by the keel blocks, may be made of solid mass concrete to provide for the local ship load. As illustrated in Fig. 13, the blocks 63 are made of the same height and the incline between the same and the side walls is filled with special shaped blocks 64, the smaller spaces being filled with mass concrete.

In the form illustrated in Fig. 10, certain of the blocks 63' are made full height, while certain intermediate blocks are made of less height, the arrangement being such as to provide longitudinal channels or runways 63'' in the floor of the dock which receive the rollers 43 of the adjustable shores, said runways 63 being filled in with mass concrete behind the shores as the latter advance, the concrete filling serving as an abutment for the hydraulic jacks 44 which force the shores forward.

The side walls of the dock are formed for the larger part of blocks of uniform size and shape, made of reinforced concrete, a typical block being shown in detail in Fig. 12 and consisting of a hollow shell 65 generally L-shaped in cross section, the hollow extending from top to bottom through both the vertical and horizontal portions and being divided by a transverse rib 66 extending between the front and back walls of the block, which serves to strengthen the individual blocks to a degree sufficient to carry the pressure of the revetted material behind the side walls and any local loading brought against the altars. The blocks are assembled in courses, as illustrated in Figs. 10, 11 and 13, so that they are interlocked, the bottom of each block resting upon the top of one subjacent block and the angular foot of the next block below, thereby leaving clear spaces throughout the several courses of blocks which may be filled with puddle, sand, or other material, to provide the necessary weight. If desired, the material excavated from the dock prism may be filled in the spaces of the hollow blocks. This puddle may, if desired, be carried within six inches or more of the top of the block, and if necessary, said block may be sealed with a slab of concrete. As stated, for the most part, the side walls are composed of the typical blocks 65, which are of uniform shape and size, and which may be made on the ground near the place of use, or at any other accessible place that may be better adapted for purposes of inspection and seasoning. In those sections of the side walls where the block 65 cannot be used, mass concrete may be applied or hollow concrete blocks of special and suitable form may be substituted, such special form of blocks being illustrated in courses marked 65', 65'' and 65''', but even under these circumstances, but few different forms of molds will be required to supply all of the blocks necessary to construct the whole of the side walls of the dock.

The blocks are laid in courses to break joints vertically and horizontally, as more particularly illustrated in Fig. 11, and in order to take care of the expansion of the dock walls due to temperature changes or other causes, the transverse joints are left dry at sections where expansion joints are deemed necessary, and suitable water proofing material 80 is filled in between the longitudinal joints. This disposition of the water proofing material prevents any seepage of water or moisture through the walls and at the same time prevents the loss of the insulating or water proofing material by squeezing out in hot weather. It will also be noted that the reinforcing rib 66 of each block falls in line with the end walls of the adjacent blocks so as to interpose a series of continuous reinforces transversely of the side walls, thereby materially strengthening the latter.

The entire interior of the dock may be lined with a facing of granite or other suitable material, as indicated in Fig. 13.

The procedure in constructing a dock, subaqueous wall or similar structure in accordance with my invention, involving as it does the use of a movable coffer-dam that can be moved ahead by means of hydraulic jacks as the work behind progresses, and the application of the hollow reinforced concrete blocks of uniform shape and size to the side wall, not only expedites the work of construction, but it is estimated that the time required to build a permanent dock will be reduced from thirty to fifty per cent. with a corresponding reduction in the ultimate cost. Excavation in front of the cofferdam need be carried on only far enough to allow the dam to be moved one space at a time. By this means, the banks on either side of the structure will be in no danger of giving away, and the work can be carried on in proximity to other structures without danger. Excessive pumping will be avoided, as at no period in the operation will more than a few feet of sub-grade be exposed. The coffer-dam may be made of standard structural steel shapes, and the several sections assembled and applied in position substantially at grade. The provision of the sectional, removable shoe around the bottom of the dam greatly facilitates the sinking of the dock and the metal cutting plates around the outer periphery of the front face materially lessens the energy required to move the dock ahead.

What I claim is:—

1. Apparatus for constructing dry docks and the like, comprising a coffer-dam open at the top, bottom and rear and having hollow front and side walls, power mechanism disposed between the dam and the work for advancing the dam, and means for maintaining water tight joints between the side walls of the dam and finished portions of the dock.

2. Apparatus for constructing dry docks and the like, comprising a coffer-dam open at the top, bottom and rear and having hollow front and side walls, power mechanism disposed between the dam and the work for advancing the dam, and pneumatic means for maintaining water tight joints between the side walls of the dam and finished portions of the dock.

3. Apparatus for constructing dry docks and the like, comprising a coffer-dam having front and side walls and open at the top, bottom and rear, means for causing said dam to sink to the depth required for the dock construction, power mechanism for successively advancing said dam horizontally at its attained depth, and means for maintaining water tight joints between the side walls of the dam and the finished portions of the dock.

4. Apparatus for constructing dry docks and the like, comprising a coffer-dam having front and side walls made up of multiple sections adapted to be assembled and secured together in vertical series, said dam being open at the top, bottom and rear.

5. Apparatus for constructing dry docks and the like, comprising a coffer-dam having front and side walls made up of multiple sections adapted to be assembled and secured together in vertical series, said dam being open at the top, bottom and rear, and means for maintaining water tight joints between the side walls and the finished portions of the dock.

6. Apparatus for constructing dry docks and the like, comprising a coffer-dam having front and side walls made up of multiple sections adapted to be assembled and secured together in vertical series, said dam being open at the top, bottom and rear, and expansible pneumatic diaphragms in the side walls adapted to be forced into engagement with the finished wall of the dock to form water tight joints between the dam and dock.

7. Apparatus for constructing dry docks and the like, comprising front and side walls formed of multiple sections removably secured together in vertical series, removable cutter plates secured to the forward face of the front wall, and means for maintaining water tight joints between the side walls and the finished portions of the dock.

8. Apparatus for constructing dry docks and the like, comprising front and side walls formed of multiple sections removably secured together in vertical series, removable cutter plates secured to the forward face of the front wall, jet pipes extending from the face of the front wall, and means for maintaining water tight joints between the side walls and the finished portions of the dock.

9. Apparatus for constructing dry docks and the like, comprising a coffer-dam open at top, bottom and rear and having front and wing walls, a cutting shoe removably secured to the bottom of the front and side walls to assist in sinking the dam, and means for horizontally advancing the dam independently of said shoe.

10. Apparatus for constructing dry docks and the like, comprising a coffer-dam open at top, bottom and rear and having front and wing walls, a sectional cutting shoe removably secured to the bottom of the front and side walls to assist in sinking the dam, and means for horizontally advancing the dam independently of said shoe, whereby the several sections of the shoe are disengaged from the dam as the latter advances from its initial position.

11. Apparatus for constructing dry docks and the like, comprising a coffer-dam open at top, bottom and rear and having front and wing walls, cutter plates secured to the forward face of the front wall, a cutting shoe removably secured to the bottom of the front and side walls to assist in sinking the dam, and means for horizontally advancing the dam independently of said shoe.

12. Apparatus for constructing dry docks and the like, comprising a coffer-dam open at top, bottom and rear, having a hollow front wall made up of sectional units secured together in vertical series, wing walls connected to said front walls and comprising sectional units arranged in vertical series, and means for maintaining water tight joints between said wing walls and the finished portions of the dock.

13. Apparatus for constructing dry docks and the like, comprising a coffer-dam open at top, bottom and rear and having a sectional hollow front wall and wing walls connected therewith, the several front wall sections comprising horizontal longitudinal girders, vertical transverse spacing frames between said girders, and facing plates connecting the girders.

14. Apparatus for constructing dry docks and the like, comprising a coffer-dam open at top, bottom and rear and having a sectional hollow front wall and wing walls connected therewith, the several front wall sections comprising horizontal longitudinal girders, vertical transverse spacing frames between said girders, and facing plates connecting the girders, certain of said frames being provided with solid webs to divide the wall sections into water tight compartments.

15. Apparatus for constructing dry docks and the like, comprising a coffer-dam open at top, bottom and rear and having hollow sectional front and wing walls, each of said wall sections comprising a horizontal longitudinal girder, transverse spacing frames and front and rear facing plates.

16. Apparatus for constructing dry docks and the like, comprising a coffer-dam open at top, bottom and rear and having front and wing walls, means for maintaining water tight joints between the wing walls and the finished portions of the dock, means for advancing said coffer-dam horizontally as the work progresses, and movable shores interposed between the inner face of the front wall and the work.

17. Apparatus for constructing dry docks and the like, comprising a coffer-dam open at top, bottom and rear and having front and wing walls, means for maintaining water tight joints between the wing walls and the finished portions of the dock, means for advancing said coffer-dam horizontally as the work progresses, and longitudinally and laterally adjustable shores interposed between the inner face of the front wall and the work.

18. Apparatus for constructing dry docks and the like, comprising a coffer-dam open at top, bottom and rear and having front and wing walls, means for maintaining water tight joints between the wing walls and the finished portions of the dock, means for advancing said coffer-dam horizontally as the work progresses, longitudinally and laterally adjustable shores interposed between the inner face of the front wall and the work, and adjustable braces between adjacent shores.

19. Apparatus for constructing dry docks and the like, comprising a movable coffer-dam, shores interposed between said coffer-dam and the partially finished dock structure, and means for simultaneously advancing the coffer-dam and shores longitudinally of the dam site as the work progresses.

20. Apparatus for constructing dry docks and the like, comprising a movable coffer-dam, shores interposed between said coffer-dam and the partially finished dock structure, adjustable diagonal braces between the several shores to permit individual shores to be moved laterally, and means for simultaneously advancing the coffer-dam and shores longitudinally of the dam site as the work progresses.

21. A dry dock or like structure comprising a bottom of mass concrete surmounted by an inverted arch of hollow reinforced concrete blocks and side walls of hollow reinforced concrete blocks which break joints horizontally and vertically.

22. A dry dock or like structure having side walls formed of hollow reinforced concrete blocks L-shaped in vertical transverse section, and provided with integral transverse vertical ribs between the front and back faces.

23. A dry dock or like structure having side walls formed of hollow reinforced concrete blocks L-shaped in vertical transverse section, provided with integral transverse vertical ribs between the front and back faces, and a filling of puddle or the like in said blocks.

24. A dry dock or like structure comprising a bottom of mass concrete surmounted by an inverted arch of hollow reinforced concrete blocks, side walls of hollow reinforced concrete blocks which break joints horizontally and vertically, and a filling of water-proof material between the longitudinal joints of the blocks in the side walls.

In testimony whereof I affix my signature, in presence of two witnesses.

LEONARD M. COX.

Witnesses:
J. L. NEVIN,
E. H. BROWNELL.